US012694740B1

(12) United States Patent
Canter et al.

(10) Patent No.: US 12,694,740 B1
(45) Date of Patent: Jul. 28, 2026

(54) DETACHABLE IMPRINTER PROVIDING SECURE PAPER PATH BETWEEN OPTICAL SCANNER AND BALLOT BOX

(71) Applicant: Hart InterCivic, Inc., Austin, TX (US)

(72) Inventors: James M. Canter, Austin, TX (US);
Lynn Simpson, Austin, TX (US);
Eugene Konovalenko, Austin, TX
(US); Viktor Partyshev, Austin, TX
(US); Scott Olds, Austin, TX (US);
Ryan Whinery, Austin, TX (US)

(73) Assignee: Hart InterCivic, Inc., Austin, TX (US)

( * ) Notice: Subject to any disclaimer, the term of this
patent is extended or adjusted under 35
U.S.C. 154(b) by 7 days.

(21) Appl. No.: 19/040,443

(22) Filed: Jan. 29, 2025

(51) Int. Cl.
G07C 13/02 (2006.01)
H04N 1/00 (2006.01)
(52) U.S. Cl.
CPC ......... G07C 13/02 (2013.01); H04N 1/00795
(2013.01)
(58) Field of Classification Search
CPC ............................ G07C 13/02; H04N 1/00795
See application file for complete search history.

(56) References Cited

U.S. PATENT DOCUMENTS

| | | | |
|---|---|---|---|
| 7,881,652 B2 | 2/2011 | Edwards et al. | |
| 8,444,135 B2 | 5/2013 | Morita et al. | |
| 9,944,097 B1 | 4/2018 | Younis et al. | |
| 10,620,885 B2 | 4/2020 | Iwata | |
| 12,094,254 B2 | 9/2024 | Canter et al. | |
| 12,488,647 B1 | 12/2025 | Gruner et al. | |
| 2006/0280534 A1 | 12/2006 | Cook et al. | |
| 2023/0196861 A1* | 6/2023 | Canter ................... | G07C 13/00 |
| | | | 705/12 |

OTHER PUBLICATIONS

Canon, Image Formula DR-G2140, "High Speed, High-Quality
Scanning for Outstanding Production Efficiency", 2019, 2 pgs.
Fijitsu, FI-760PRB Imprinter, Operator's Guide, P3PC-6112-01EN,
Jun. 2017, 25 pgs.
"EAC Decision On Request For Interpretation", U.S. Election
Assistance Commission, 2024, 2 pgs.
"Voluntary Voting System Guidelines VVSG 2.0", Election Assis-
tance Commission, Technical Guidelines Development Committee,
Feb. 2020, 364 pgs.

* cited by examiner

*Primary Examiner* — David H Banh
(74) *Attorney, Agent, or Firm* — Egan, Enders & Huston
LLP.

(57) ABSTRACT

Embodiments of systems and methods are disclosed herein
to print a unique identifier on a printed election sheet,
wherein the printed election sheet includes a voter's voting
selections in an election. More specifically, the present
disclosure provides improved systems and methods that
provide the capability of printing (or "imprinting") a unique
identifier onto a printed election sheet when the printed
election sheet is scanned to create an electronic cast vote
record (CVR) of the voter's voting selections.

22 Claims, 12 Drawing Sheets

DETACHABLE IMPRINTER PROVIDING SECURE PAPER PATH BETWEEN OPTICAL SCANNER AND BALLOT BOX

BACKGROUND OF THE INVENTION

The present disclosure relates to printer mechanisms used to print (or "imprint") text onto optically scanned printed election sheets. More specifically, the present disclosure is directed to an imprinting system (or "imprinter"), which is capable of printing a unique identifier onto an optically scanned printed election sheet, but not integrated within a scanner.

A variety of electronic voting systems are well known. In one electronic voting system, a voter may hand-mark voting selections on a pre-printed unmarked paper ballot. Once voting selections are complete, a scanner may be used to create an electronic cast vote record of the voter's voting selections. An "electronic cast vote record" is an electronic record that indicates the voter's choice, or voting selections, in a manner determined in accordance with the voting system. Thus, an electronic cast vote record is an electronic record of a voter's cast vote selections and may be used in the vote tabulation process.

Another example of an electronic voting system is a direct recording electronic (DRE) voting system. As known in the art, DRE voting systems electronically record votes to directly create an electronic cast vote record. In contrast to DRE voting systems, other electronic voting systems may use a ballot marking device (BMD) to receive a voter's electronic vote selections, a printer to generate a full faced printed marked ballot containing the voter's electronic vote selections, and a scanner to scan the printed marked ballot for creation of the electronic cast vote record (CVR) and electronic tabulation. In some election work flows, the printer output may also be a printed vote record (PVR). The use of printed marked ballots and printed vote records in an electronic voting allows the creation of a paper trail of voter selections that may be used, for example, by an elections office for audit purposes. Electronic voting systems that generate and scan printed marked ballots and printed vote records are also known as "hybrid voting systems," since they fall between all electronic DRE voting and purely paper-based hand-marked ballots.

Some ballot marking devices may utilize a printer to generate a printed election sheet. As used herein, a "printed election sheet" refers to a printed election sheet that is utilized in an election voting workflow. Examples of printed election sheets include but are not limited to marked ballots (either hand or machine marked), printed vote records, or any other printed election sheet that is utilized to indicate the voting selections of a voter in an election. In some cases, the printed election sheet may be printed on full sized sheets of paper (e.g., standard 8.5×11 inch or 8.25×14 inch paper stock). However, the printed election sheet may also be printed on customized or specialized sheet sizes. In some cases, for example, the length (and/or width) of the printed election sheet may be dependent on the number of contests in the election. As such, the length (and/or width) of the printed election sheet may vary from one election to the next and from one precinct to another.

Once a printed election sheet is generated for a voter, it is often hand-delivered by the voter or a voter assistant (for example, an election official or poll worker) to a digital scanner (or "precinct scanner") for creation of an electronic cast vote record (CVR). The scanner is often mounted on top of a secure ballot box to provide a secure paper path between the scanner and the ballot box. Once scanned, the printed election sheet output from the scanner is dropped into the ballot box for storage.

The Voluntary Voting System Guidelines 2.0 (VVSG 2.0) states in Section 9.1.5-F that a paper-based voting system must be capable of adding a unique identifier after a voter casts their ballot. The VVSG 2.0 further states that, although not all jurisdictions may use this feature, voting systems are required to have the capability to add a unique identifier to ballots. The U.S. Election Assistance Commission (EAC) Decision on the Request for Interpretation (RFI) 2024-01 9.1.5-F Unique Identifier clarifies that the unique identifier must be added after a ballot is cast and at a time such that the information can be captured in its associated CVR. Thus, the VVSG 2.0 and RFI require paper-based voting systems to provide the capability of printing (or "imprinting") a unique identifier onto a printed election sheet when the printed election sheet is scanned to create an electronic CVR.

In order to meet this requirement, some commercially available scanners allow imprinting technology (e.g., imprinting electronics, mechanics, etc.) to be integrated within the scanner as an integrated subsystem or an after-market add-on (either prior to purchase by an integrator or added by a skilled technician post purchase). Scanners having integrated scanning/imprinting technology are holistically designed systems in which the imprinting technology is a subsystem of the scanner itself. In these systems, the scanner controls the imprinting subsystem and imprinting activities, such as the paper feed management (e.g., rollers, belts, etc.), placement of the imprinting electronics and printing media (e.g., ink jet cartridge, ribbon, etc.), and the imprinting electronics and firing intelligence (which dictates when to print on the sheet based on the movement of the paper through the scanner based on roller motor timing). The scanner is connected to and controlled by a host, which informs the scanner when to scan a printed election sheet, what values/information to imprint on the scanned printed election sheet. Once a printed election sheet is scanned, the digital scanning results are passed from the scanner to the host. However, because the scanner and the imprinter are integrated into a single unit, the act of imprinting is controlled by the scanner, not the host.

Scanners designed with the capability of providing integrated scanning/imprinting solutions have several disadvantages. For example, if scanners are purchased for use without imprinting technology, which is typically the case in electronic voting systems, skilled technicians are required to disassemble the scanner and add/assemble the integrated imprinting subsystem into the scanner prior to first use. The installation of the integrated imprinting subsystem is complex and not easily installed by untrained personnel. This installation complexity may hinder/limit the use of integrated scanning/imprinting solutions.

Scanners having integrated imprinting subsystems also raise security concerns when consumables (such as printer ink, ribbon, etc.) are inevitably replaced. For example, when replacing an ink jet cartridge within an integrated imprinting subsystem, the scanner housing must be opened to gain access to the internally located imprinting subsystem. This provides access to a critically secure area (e.g., the secure paper path) and raises the specter of a security vulnerability through an attack vector.

Thus, it would be desirable to provide an imprinting system, which is capable of imprinting a unique identifier onto an optically scanned printed election sheet, but not integrated within a scanner.

SUMMARY OF THE INVENTION

The present disclosure provides improved systems and methods to print a unique identifier on a printed election sheet, wherein the printed election sheet includes a voter's voting selections in an election. More specifically, the present disclosure provides improved systems and methods that provide the capability of printing (or "imprinting") a unique identifier onto a printed election sheet when the printed election sheet is scanned to create an electronic cast vote record (CVR) of the voter's voting selections. As such, the improved systems and methods disclosed herein meet the requirements set forth in Section 9.1.5-F of the Voluntary Voting System Guidelines 2.0 ("VVSG 2.0") and the U.S. Election Assistance Commission (EAC) Decision on the Request for Interpretation (RFI) 2024-01 9.1.5-F regarding the "unique identifier."

Unlike conventional solutions, which integrate imprinting technology within a commercially available scanner, the embodiments disclosed herein provide an externally attached, non-integrated imprinting system (or "imprinter") designed to detachably couple between a scanner configured to optically scan the printed election sheet and a ballot box configured to store the optically scanned printed election sheet. By providing a non-integrated imprinting solution, the embodiments disclosed herein meet governmental requirements regarding the printing of unique identifiers on scanned election sheets without requiring skilled technicians to install the imprinting solution or risking exposure to critically secure areas such as, for example, the paper path extending between the scanner and the ballot box. Further advantages of the improved imprinting system are discussed below.

According to one embodiment, an election voting system system is provided herein comprising a scanner, an imprinter and a host processing device, which is communicatively coupled to the scanner and the imprinter. The scanner may generally include an input port coupled to receive the printed election sheet, an optical scanner subassembly configured to optically scan the printed election sheet and generate a scanned image of the printed election sheet and an output port coupled to output the printed election sheet. The imprinter is detachably coupled between the scanner and a ballot box configured to store the printed election sheet. Thus, the imprinter is externally attached, non-integrated imprinting system, which is not integrated within the scanner. The imprinter is coupled to receive the printed election sheet from the output port of the scanner and configured to print a unique identifier onto the printed election sheet before the printed election sheet is provided to the ballot box. The host processing device is coupled to receive the scanned image of the printed election sheet from the scanner and configured to use the scanned image of the printed election sheet to create an electronic cast vote record of the voter's voting selections. In some embodiments, the imprinter may be configured to print the unique identifier onto the printed election sheet during or after the electronic cast vote record is created, yet before the printed election sheet is provided to the ballot box. The host processing device is further coupled to supply command signals to the scanner and the imprinter to independently control operations performed by the scanner and the imprinter.

The imprinter may generally include: (a) an input port coupled to receive the printed election sheet output from the output port of the scanner, (b) a paper guide mechanism positioned between the input port of the imprinter and an output port of the imprinter for passively guiding the printed election sheet through a paper path of the imprinter, and (c) a printer subassembly configured to print the unique identifier onto the printed election sheet while the printed election sheet is positioned within the paper path of the imprinter. When the imprinter is coupled between the scanner and the ballot box, the output port of the imprinter may be coupled to provide the printed election sheet having the unique identifier printed thereon to the ballot box. In some embodiments, the imprinter may further include a removable cassette comprising a consumable print medium. In such embodiments, the removable cassette may be at least partially removed from the imprinter to gain access to the consumable print medium, while preventing access to the paper path of the imprinter.

The optical scanner subassembly may generally include: (a) hardware components configured to optically scan the printed election sheet and generate the scanned image of the printed election sheet, (b) a roller subassembly for actively guiding the printed election sheet through a paper path extending between the input port of the scanner and the output port of the scanner, and (c) a microprocessor coupled to control the hardware components and the roller subassembly in response to command signals received from the host processing device.

In some embodiments, the scanner may further include the host processing device. In other embodiments, the host processing device may be an external processing component remotely located from, yet communicatively coupled to the scanner and the imprinter.

In some embodiments, the host processing device may be communicatively coupled to the optical scanner subassembly included within the scanner and the printer subassembly included within the imprinter to independently control operations of the optical scanner subassembly and the printer subassembly by supplying command signals thereto. For example, the host processing device may be coupled to supply: (a) a first set of command signals to the optical scanner subassembly, which cause the roller subassembly to feed the printed election sheet received at the input port of the scanner into the optical scanner subassembly, and (b) a second set of command signals to the optical scanner subassembly, which cause the hardware components to optically scan the printed election sheet, generate the scanned image of the printed election sheet and supply the scanned image of the printed election sheet to the host processing device for further processing.

In some embodiments, the host processing device may use the scanned image of the printed election sheet to create an electronic cast vote record (CVR) of the of the voter's voting selections and generate a unique identifier associated with the electronic CVR. After creating the electronic CVR and unique identifier, the host processing device may supply additional command signals to the optical scanner subassembly and/or the printer subassembly, depending on whether or not the imprinter is physically coupled between the scanner and the ballot box.

When the imprinter is not coupled between the scanner and the ballot box, for example, the host processing device may be coupled to supply a third set of command signals to the optical scanner subassembly, which cause the roller subassembly to continue to feed the printed election sheet through the paper path and the output port of the scanner into the ballot box. The printed election sheet provided to the ballot box in this scenario contains the voter's voting selections, but does not include a unique identifier.

When the imprinter is coupled between the scanner and the ballot box, the host processing device may be coupled to supply: (a) a third set of command signals to the optical scanner subassembly, which cause the roller subassembly to continue to feed the printed election sheet through the paper path and the output port of the scanner into the input port and the paper path of the imprinter, (b) a fourth set of command signals to the printer subassembly to print the unique identifier onto the printed election sheet, and (c) a fifth set of command signals to the optical scanner subassembly, which cause the roller subassembly to continue to feed the printed election sheet through the paper path and the output port of the imprinter into the ballot box after the unique identifier is printed onto the printed election sheet. In this scenario, the printed election sheet provided to the ballot box contains the voter's voting selections and the unique identifier printed thereon.

In some embodiments, the host processing device may synchronize the imprinting functions performed by the imprinter with the paper handling operations performed by the scanner. For example, the fourth set of command signals supplied by the host processing device to the printer subassembly may include a print command, the unique identifier and a time delay specifying when to print the unique identifier onto the printed election sheet.

In other embodiments, imprinter may utilize a sense mark provided on the printed election sheet to determine when to print the unique identifier onto the printed election sheet. In such embodiments, the fourth set of command signals supplied by the host processing device to the printer subassembly may include a print command and the unique identifier, and the imprinter may print the unique identifier onto the printed election sheet upon detecting the sense mark provided on the printed election sheet.

According to another embodiment, an imprinter is provided herein for use in an election voting workflow utilizing a printed election sheet of a voter's voting selections in an election. The imprinter may generally include an imprinter housing detachably coupled between a scanner (configured to optically scan the printed election sheet and generate a scanned image of the printed election sheet) and a ballot box (configured to store the optically scanned printed election sheet). The imprinter may further include: (a) an input port provided on a top cover of the imprinter housing, wherein the input port is coupled to receive the optically scanned printed election sheet from an output port of the scanner, (b) a paper guide mechanism positioned between the input port of the imprinter and an output port of the imprinter for passively guiding the optically scanned printed election sheet through a paper path of the imprinter, and (c) a printer subassembly configured to print a unique identifier onto the optically scanned printed election sheet while the optically scanned printed election sheet is positioned within the paper path of the imprinter. The output port of the imprinter is provided on a bottom cover of the imprinter housing and coupled to provide the optically scanned printed election sheet having the unique identifier printed thereon to the ballot box.

In some embodiments, the imprinter may further include a removable cassette comprising a consumable print medium. In such embodiments, the removable cassette may be at least partially removed from the imprinter to gain access to the consumable print medium while preventing access to the paper path of the imprinter.

In some embodiments, the printer subassembly may be coupled to receive command signals from a host processing device communicatively coupled to the imprinter to control the printing of the unique identifier onto the optically scanned printed election sheet. In one embodiment, the command signals received from the host processing device may comprise a print command, the unique identifier and a time delay specifying when to print the unique identifier onto the optically scanned printed election sheet.

In some embodiments, the paper guide mechanism may include: (a) an elongated paper slot for positioning and passively guiding the optically scanned printed election sheet through the paper path of the imprinter, and (b) an opening adjacent to the printer subassembly that exposes a portion of the optically scanned printed election sheet when the optically scanned printed election sheet is positioned within the paper path of the imprinter. The paper guide mechanism does not include a roller, a belt or another movable component configured to actively guide the optically scanned printed election sheet through the paper path of the imprinter. Instead, the scanner controls movement of the optically scanned printed election sheet through the paper path of the imprinter.

In some embodiments, the imprinter may further include a removable cassette comprising the printer subassembly and a consumable print medium. When the removable cassette is fully inserted within the imprinter housing, a print head of the printer subassembly may be positioned adjacent to the opening in the paper guide mechanism at a distance that enables the print head to print the unique identifier onto the optically scanned printed election sheet. When the consumable print medium needs to be replaced, the removable cassette may be at least partially removed from the imprinter housing to gain access to the consumable print medium, while preventing access to the paper path of the imprinter.

According to yet another embodiment, a method is provided herein to print a unique identifier on a printed election sheet of a voter's voting selections in an election. The method described herein may generally begin by providing an imprinter having: (a) an imprinter housing that is detachably coupled between a scanner and a ballot box, (b) an input port that is aligned within an output port of the scanner, and (c) an output port that is aligned within an opening in the ballot box. The method may further include: (i) receiving a printed election sheet at the input port of the imprinter, wherein the printed election sheet is received from the output port of the scanner after the printed election sheet is optically scanned by the scanner to generate a scanned image of the printed election sheet, (ii) advancing the printed election sheet through a paper path extending between the input port and the output port of the imprinter, (iii) printing the unique identifier onto the printed election sheet while the printed election sheet is positioned within the paper path of the imprinter, and (iv) transferring the printed election sheet having the unique identifier printed thereon to the ballot box for storage.

In some embodiments, said advancing the printed election sheet through a paper path extending between the input port and the output port of the imprinter and said transferring the printed election sheet to the ballot box may be performed by the scanner in response to command signals received by the scanner from a host processing device communicatively coupled to the scanner and the imprinter.

In some embodiments, said printing the unique identifier onto the printed election sheet may be performed by the imprinter in response to a command signal received by the imprinter from the host processing device. For example, the command signal received by the imprinter may include a print command, the unique identifier and a time delay specifying when to print the unique identifier onto the printed election sheet.

In some embodiments, the imprinter may further include a removable cassette comprising a consumable print medium. In such embodiments, the method may further include at least partially removing the removable cassette from the imprinter housing to gain access to the consumable print medium while preventing access to the paper path of the imprinter.

In some embodiments, the removable cassette may further include a print head. In such embodiments, said printing the unique identifier onto the printed election sheet may be enabled when: (a) the removable cassette is fully inserted within the imprinter housing to position the print head adjacent to the printed election sheet positioned within the paper path of the imprinter, and (b) the imprinter receives a command signal from a host processing device to print the unique identifier onto the printed election sheet.

As noted above and described further herein, the present disclosure provides various embodiments of systems and methods to print a unique identifier onto a printed election sheet. Of course, the order of discussion of the different steps as described herein has been presented for the sake of clarity. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this Summary Section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the disclosed concept and are therefore not to be considered limiting of its scope, for the disclosed concept may admit to other equally effective embodiments.

DESCRIPTION OF THE PREFERRED EMBODIMENTS

The present disclosure provides improved systems and methods to print a unique identifier on a printed election sheet, wherein the printed election sheet includes a voter's voting selections in an election. More specifically, the present disclosure provides improved systems and methods that provide the capability of printing (or "imprinting") a unique identifier onto a printed election sheet when the printed election sheet is scanned to create an electronic cast vote record (CVR) of the voter's voting selections. As such, the improved systems and methods disclosed herein meet the requirements set forth in Section 9.1.5-F of the Voluntary Voting System Guidelines 2.0 ("VVSG 2.0") and the U.S. Election Assistance Commission (EAC) Decision on the Request for Interpretation (RFI) 2024-01 9.1.5-F regarding the "unique identifier."

Unlike conventional solutions, which integrate imprinting technology within a commercially available scanner, the embodiments disclosed herein provide an externally attached, non-integrated imprinting system (or "imprinter") designed to detachably couple between a scanner configured to optically scan the printed election sheet and a ballot box configured to store the optically scanned printed election sheet. By providing a non-integrated imprinting solution, the embodiments disclosed herein meet governmental requirements regarding the printing of unique identifiers on scanned election sheets without requiring skilled technicians to install the imprinting solution or risking exposure to critically secure areas such as, for example, the paper path extending between the scanner and the ballot box. Further advantages of the improved imprinting system are discussed below.

Figure 1:
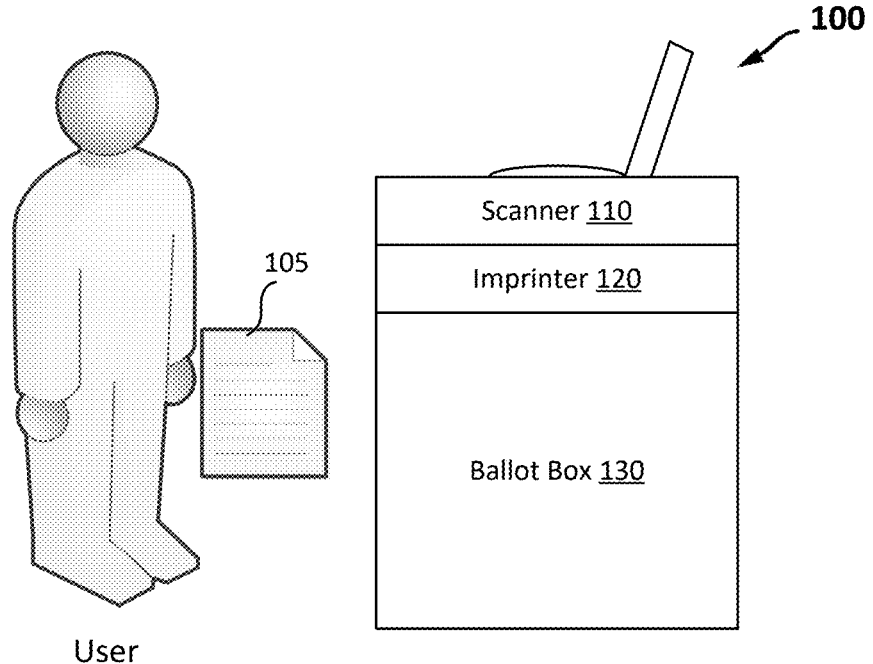
FIG. 1 is a block diagram of a system in accordance with one embodiment of the present disclosure, the system comprising an imprinter detachably coupled between a scanner and a ballot box.

FIG. 1 is a block diagram of a system 100 that provides one example of an election voting system for processing a printed election sheet 105 of a voter's voting selections in an election. The printed election sheet 105 processed by the system 100 may be a marked ballot (either a hand-marked or machine-marked ballot), a printed vote record (PVR) or any other printed election sheet that is utilized to indicate the voting selections of a voter in an election.

As shown in FIG. 1, the system 100 generally includes an imprinter 120, which is detachably coupled between a scanner 110 (e.g., a "precinct scanner") and a ballot box 130. The scanner 110 is configured to optically scan the printed election sheet 105 to generate a scanned image of the printed election sheet 105 and create an electronic cast vote record (CVR) of the voter's voting selections. The imprinter 120 is configured to print a unique identifier onto the printed election sheet 105 when the electronic CVR is created, yet before the printed election sheet 105 is provided to the ballot box 130 for secure storage. The unique identifier is preferably an alphanumeric text string that uniquely identifies the printed election sheet 105 and/or the electronic CVR created therefrom. The alphanumeric text string may include a wide range and number of characters, which are randomly generated and/or generated based on a unique device identifier (such as, e.g., a serial number corresponding to the scanner 110).

As described in more detail below, the imprinter 120 prints the unique identifier onto the printed election sheet 105 under control of a host processing device (such as, e.g., the host computer 240 shown in FIG. 2), which is communicatively coupled to the imprinter 120 and internal components of the scanner 110. The host processing device uses the scanned image of the printed election sheet 105 to create the electronic CVR and a unique identifier associated with the CVR. Once created, the host processing device provides the unique identifier to the imprinter 120, along with instructions (e.g., a print command) to print the unique identifier onto the printed election sheet 105.

From a voter perspective, it does not matter whether the imprinter 120 is included within the system 100 or not—the voter has no interaction with the imprinting workflow. After a printed election sheet 105 is marked (either by hand or machine) with the voter's voting selections, a user (such as the voter, a voting assistant or an election official) inserts the printed election sheet 105 into the scanner 110 to generate an electronic CVR of the voter's voting selections and complete the voting process. Upon insertion of the printed election sheet 105, the sheet is pulled into the scanner 110 for optical scanning and additional processing. Assuming there are no second chance voting issues (in which a voting error is detected and the printed election sheet 105 is returned to the voter to enable the voter to change their ballot), the printed election sheet 105 is processed, an electronic CVR is created (including a unique identifier associated with the CVR), and the printed election sheet 105 is fed from the scanner 110 into the imprinter 120. Once the printed election sheet 105 is fed into the paper path of the imprinter 120, the host processing device instructs the imprinter 120 to print (or "imprint") the unique identifier associated with the CVR onto the printed election sheet 105 before the printed election sheet 105 is deposited into the ballot box 130.

Although the imprinter 120 includes electronics to drive the print head (including print head lifecycle management/monitoring, etc.), the imprinter 120 includes no active paper handling components (such as, e.g., rollers, belts or other movable components) that actively guide the printed election sheet 105 through the paper path of the imprinter 120. Instead, the imprinter 120 includes a paper guide mechanism for passively guiding the printed election sheet 105 through the paper path of the imprinter 120, with physical paper flow management (e.g., paper feed and pull) handled by the paper handling components included within the scanner 110, under control of the host processing device.

Figure 2:
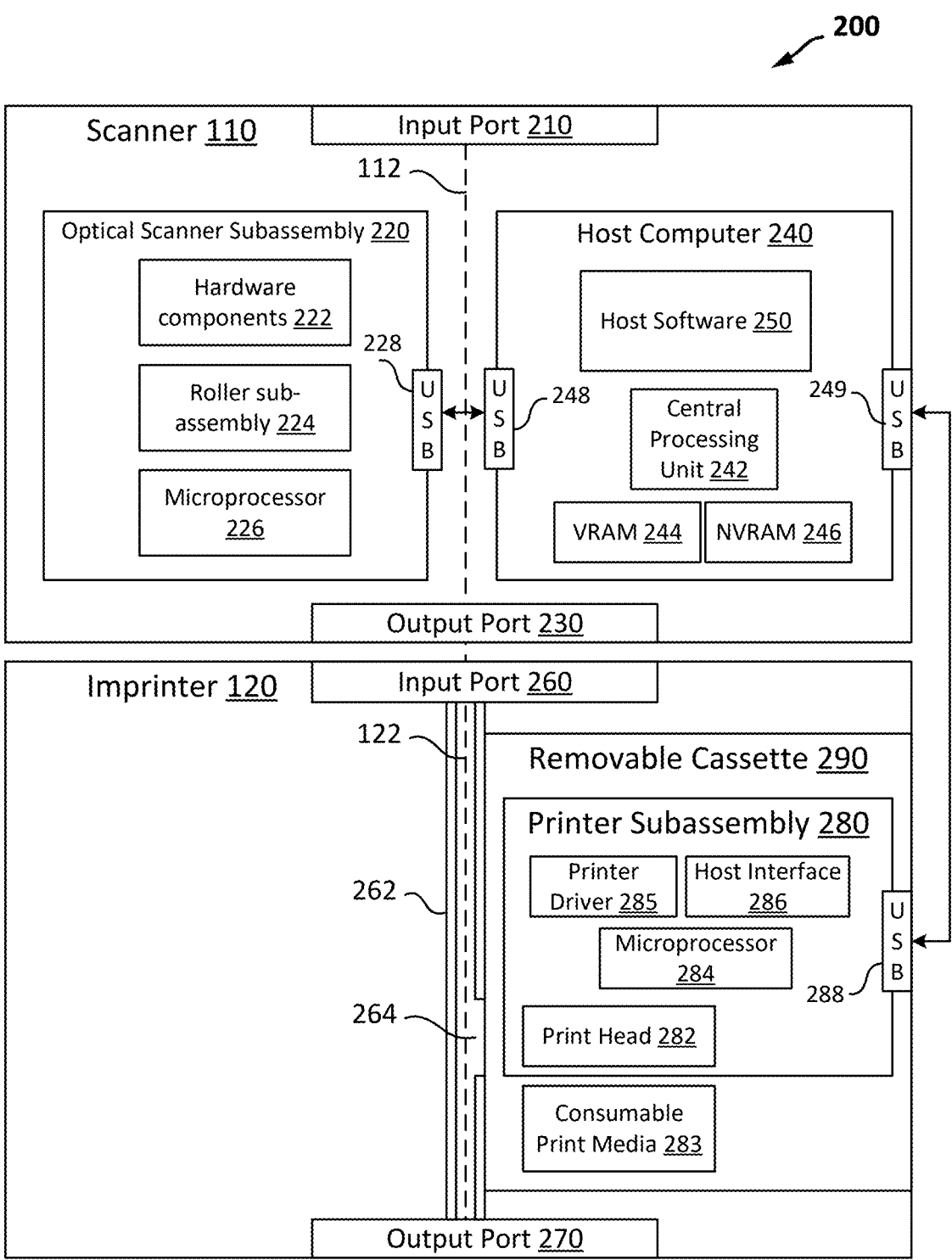
FIG. 2 is a block diagram illustrating various hardware and software components that may be included within the scanner and the imprinter according to one embodiment of the present disclosure.

FIG. 2 is a block diagram 200 illustrating various hardware and software components that may be included within the scanner 110 and imprinter 120 shown in FIG. 1. It is recognized that the hardware and software components shown in FIG. 2 are examples of components that may be used to perform various aspects of the present invention, and are not intended to illustrate an entirety of the components included within the scanner 110 and imprinter 120. As such, additional hardware and/or software components not explicitly shown in FIG. 2 may also be included.

In some embodiments, the scanner 110 shown in FIGS. 1 and 2 may be a precinct scanner used to process a voter's marked ballot and generate an electronic CVR of the voter's voting selections. As such, the scanner 110 may generally include: (a) an input port 210 coupled to receive a printed election sheet 105 (e.g., a marked ballot or PVR) from a user, (b) an optical scanner subassembly 220 configured to optically scan the printed election sheet 105 and generate a scanned image of the printed election sheet 105, and (c) an output port 230 coupled to output the optically scanned printed election sheet 105. The scanner 110 may further include a host computer 240 and host software 250, as described in more detail below.

In one example embodiment, the optical scanner subassembly 220 may be a Universal Serial Bus (USB)-connected off-the-shelf embedded scanner, which provides optical scanning and paper handling through both the scanner 110 and the imprinter 120. More specifically, and as shown in FIG. 2, the optical scanner subassembly 220 may include various hardware components 222 (such as, e.g., a light source, optics, scan head, photosensitive detector and associated electronics) for optically scanning the printed election sheet 105, a roller-subassembly 224 for actively guiding the printed election sheet 105 through the paper path 112 of the scanner 110 and the paper path 122 of the imprinter 120, and a microprocessor 226 for communicating with the host computer 240 and controlling the hardware components 222 and the roller-subassembly 224. As shown in FIG. 2 and described in more detail below, the host computer 240 may supply command signals to the microprocessor 226 to control the hardware components 222 and the roller-subassembly 224 via the USB interfaces 228 and 248 connecting the host computer 240 to the optical scanner subassembly 220. The host computer 240 may also receive the scanned image of the printed election sheet 105 from the microprocessor 226 via USB interfaces 228 and 248.

The imprinter 120 shown in FIGS. 1 and 2 is an externally attached, non-integrated imprinting system designed to detachably couple between the scanner 110 and the ballot box 130. As shown in FIG. 2, the imprinter 120 may generally include: (a) an input port 260 coupled to receive the printed election sheet 105 from the output port 230 of the scanner 110, (b) a paper guide mechanism 262 positioned between the input port 260 of the imprinter 120 and an output port 270 of the imprinter 120 for passively guiding the printed election sheet 105 through the paper path 122 of the imprinter 120, and (c) a printer subassembly 280 configured to print (or "imprint") the unique identifier onto the printed election sheet 105 before the printed election sheet 105 is provided to the ballot box 130.

The printer subassembly 280 includes a print head 282 configured to print the unique identifier onto the printed election sheet 105 while the printed election sheet 105 is positioned within the paper path 122 of the imprinter 120. In some embodiments, the print head 282 may utilize a consumable print medium 283 (such as, e.g., an ink jet cartridge, ribbon, etc.) to transfer data (e.g., an alphanumeric text string) onto the printed election sheet 105 to "imprint" the unique identifier. The printer subassembly 280 may also include electronics to drive the print head 282 and communicate with the host computer 240. For example, the printer subassembly 280 may include a microprocessor 284, a printer driver 285 and a host interface 286, as shown in FIG. 2. As described in more detail below, microprocessor 284 may communicate with the host computer 240 via the host interface 286 and USB interface 288 connecting the printer subassembly 280 to the host computer 240 via the USB interface 249.

The host computer 240 is communicatively coupled to the scanner 110 and the imprinter 120 and configured to execute host software 250 to process the printed election sheet 105 and independently control operations performed by the scanner 110 and imprinter 120. In some embodiments, the host computer 240 and the host software 250 may be included within the scanner 110, as shown in FIG. 2. Alternatively, the host computer 240 and the host software 250 may be external processing components, which are remotely located from, yet communicatively coupled to the scanner 110 and the imprinter 120.

As shown in FIG. 2, the host computer 240 may generally include a host processing device (such as, e.g., a central processing unit (CPU) 242) and at least one non-transitory memory (such as, e.g., volatile random access memory (VRAM) 244 and non-volatile random access memory (NVRAM) 246) for storing the host software 250 and processing related data. The CPU 242 executes the program instructions contained within the host software 250 to process the printed election sheet 105 and independently control the various operations performed by the scanner 110 and the imprinter 120.

During system operation, the host computer 240 supplies command signals to the optical scanner subassembly 220 and the printer subassembly 280, under the control of the host software 250, to independently control the various operations performed by the scanner 110 and the imprinter 120. For example, the host computer 240 may supply: (a) a first set of command signals to the optical scanner subassembly 220 (via the USB interfaces 228 and 248), which cause the roller subassembly 224 to feed the printed election sheet 105 received at the input port 210 of the scanner 110 into the optical scanner subassembly 220, and (b) a second set of command signals to the optical scanner subassembly 220 (via the USB interfaces 228 and 248), which cause the hardware components 222 to optically scan the printed election sheet 105, generate the scanned image of the printed election sheet 105 and supply the scanned image of the printed election sheet 105 to the host computer 240 for further processing.

In the embodiment shown in FIG. 2, the host computer 240 supplies command signals to, and receives data from, the optical scanner subassembly 220 via the USB interfaces 228 and 248. For example, the host computer 240 supplies command signals, such as, for example, enable, disable, dots per inch (DPI), roller speed, front eject, rear eject, scan length, scan direction, etc., to the optical scanner subassembly 220 to drive high level scanner operation. Under direction of the host computer 240, the optical scanner subassembly 220 pulls in a printed election sheet 105, builds the scanned image of the printed election sheet 105, and provides the scanned image to the host computer 240. The optical scanner subassembly 220 does not process or interpret the printed election sheet 105 as a ballot. Instead, it simply collects and builds the scanned image and manages the physical movement of the printed election sheet 105 through the scanner 110 and the imprinter 120, as directed by the host computer 240.

Upon receiving the scanned image of the printed election sheet 105, the host computer 240 processes the printed election sheet 105 by analyzing the scanned image and performing mark analysis to determine if a second chance voting issue (such as an overvote) exists on the voter's marked ballot. If no second chance voting issues are detected, the host computer 240 uses the scanned image of the printed election sheet 105 to create an electronic CVR of the printed election sheet 105 and generate a unique identifier associated with the electronic CVR. After the electronic CVR and unique identifier are created, the host computer 240 may supply additional command signals to the optical scanner subassembly 220 and/or the printer subassembly 280, depending on whether or not the imprinter 120 is physically coupled between the scanner 110 and the ballot box 130.

When the imprinter 120 is not coupled between the scanner 110 and the ballot box 130, the host computer 240 is configured to supply a third set of command signals to the optical scanner subassembly 220, which cause the roller subassembly 224 to continue to feed the printed election sheet 105 through the paper path 112 and the output port 230 of the scanner 110 into the ballot box 130. The printed election sheet 105 provided to the ballot box 130 in this scenario contains the voter's voting selections, but does not include a unique identifier.

When the imprinter 120 is coupled between the scanner 110 and the ballot box 130, the host computer 240 is configured to supply: (a) a third set of command signals to the optical scanner subassembly 220, which cause the roller subassembly 224 to continue to feed the printed election sheet 105 through the paper path 112 and the output port 230 of the scanner 110 into the input port 260 and the paper path 122 of the imprinter 120, (b) a fourth set of command signals to the printer subassembly 280 to print the unique identifier onto the printed election sheet 105, and (c) a fifth set of command signals to the optical scanner subassembly 220, which cause the roller subassembly 224 to continue to feed the printed election sheet 105 through the paper path 122 and the output port 270 of the imprinter 120 into the ballot box 130 after the unique identifier is printed onto the printed election sheet 105. In this scenario, the printed election sheet 105 provided to the ballot box 130 contains the voter's voting selections and the unique identifier printed thereon.

The host computer 240 supplies command signals to, and receives data from, the printer subassembly 280 via the USB interfaces 249 and 288. For example, the host computer 240 uses the USB interfaces 249 and 288 to provide command signals to the imprinter 120 (such as what and when to imprint) and receive management information from the imprinter 120 (such as ink jet cartridge health, number of imprints, etc.). It is recognized that communication between the host computer 240 and the optical scanner subassembly 220, and between the host computer 240 and printer subassembly 280, is not limited to USB and may be provided using any other suitable communication bus (such as, e.g., a Controller Area Network (CAN) bus, etc.).

In some embodiments, the host computer 240 may synchronize the imprinting functions performed by the imprinter 120 with the paper handling operations performed by the scanner 110. For example, the fourth set of command signals supplied by the host computer 240 to the printer subassembly 280 may include a print command (or write command), the unique identifier and a time delay specifying when to print the unique identifier onto the printed election sheet 105. The time delay may be predetermined and set based on the paper handling operations performed by the scanner 110 (e.g., the roller speed, time duration of paper movement or length of paper movement through the scanner 110).

In other embodiments, imprinter 120 may utilize a sense mark provided on the printed election sheet 105 to determine when to print the unique identifier onto the printed election sheet. In such embodiments, the fourth set of command signals supplied by the host computer 240 to the printer subassembly 280 may include a print command and the unique identifier, and the imprinter 120 may print the unique identifier onto the printed election sheet 105 upon detecting the sense mark provided on the printed election sheet 105. The sense mark provided on the printed election sheet 105 may include substantially any predetermined marking (such as, e.g., a black rectangle), which signifies a desired print location for the unique identifier.

As noted above and shown in FIG. 2, the print head 282 uses a consumable print medium 283 (such as, e.g., an ink jet cartridge, ribbon, etc.) to print the unique identifier onto the printed election sheet 105. The consumable print medium 283 may become depleted over time, necessitating replacement. In order to maintain security and prevent access to secure locations within the imprinter 120 (such as the paper path 122), the printer subassembly 280 and the consumable print medium 283 may be housed within a removable cassette 290. When the removable cassette 290 is fully inserted within the imprinter 120, the print head 282 is positioned adjacent to an opening 264 in the paper guide mechanism 262 at a distance (e.g., less than one millimeter) that enables the print head 282 to print the unique identifier onto the printed election sheet 105. When the consumable print medium 283 needs to be replaced, the removable cassette 290 may be at least partially removed from the housing of the imprinter 120 to gain access to the consumable print medium 283, while preventing access to the paper path 122 of the imprinter 120. In doing so, the removable cassette 290 enables the printer subassembly 280 and the consumable print medium 283 to be serviced without compromising security. In some embodiments, the host computer 240 may be notified when the removable cassette 290 is at least partially removed from the housing of the imprinter 120. Upon receiving such notification, the host computer 240 may generate an alarm (e.g., a visual or audible alarm) to alert election personnel of the removal, thereby adding an additional layer of security.

Figure 3A:
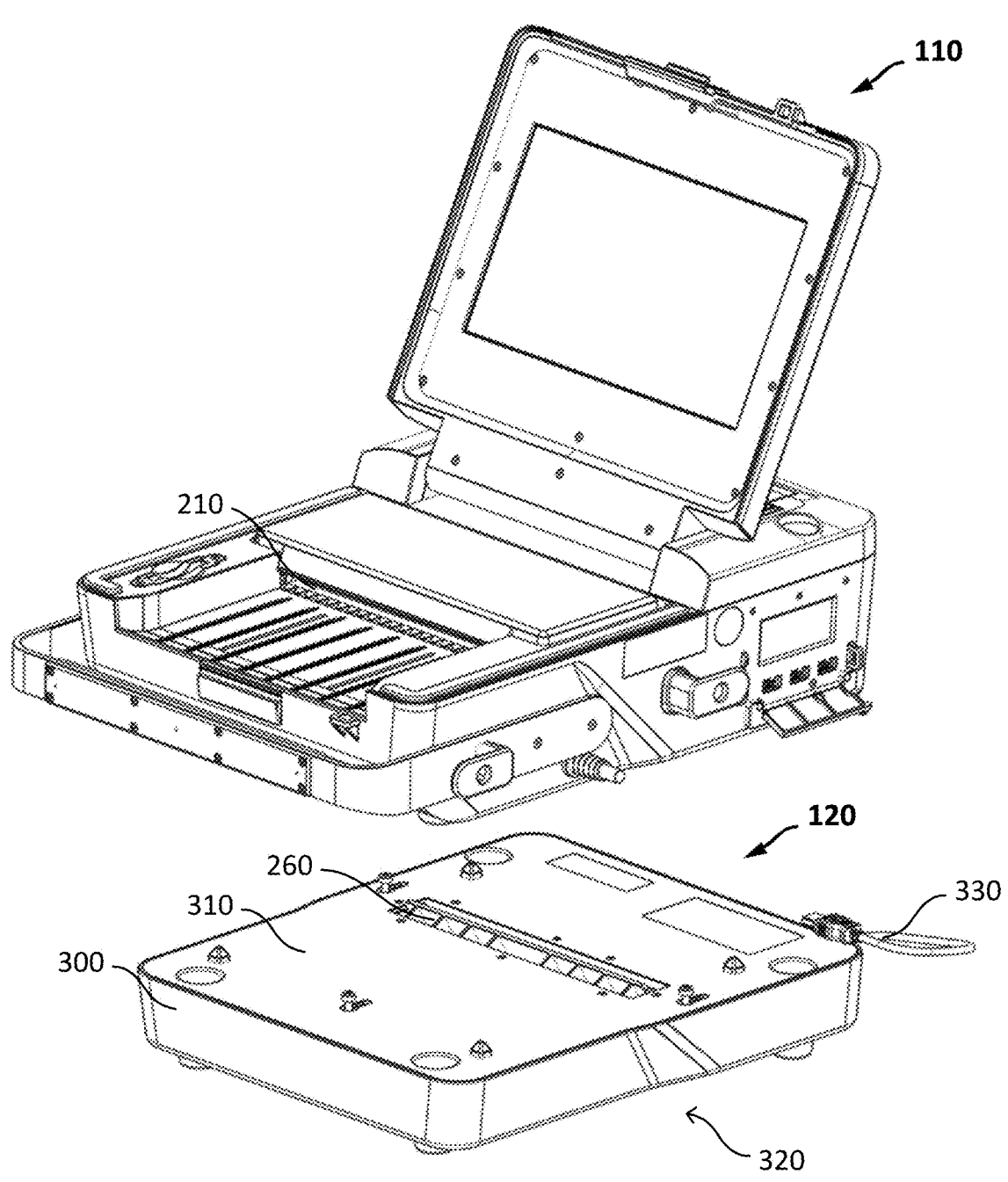
FIG. 3A is a three-dimensional (3D) front perspective view illustrating an imprinter, in accordance with one embodiment of the present disclosure, detached from a scanner.
Figure 3B:
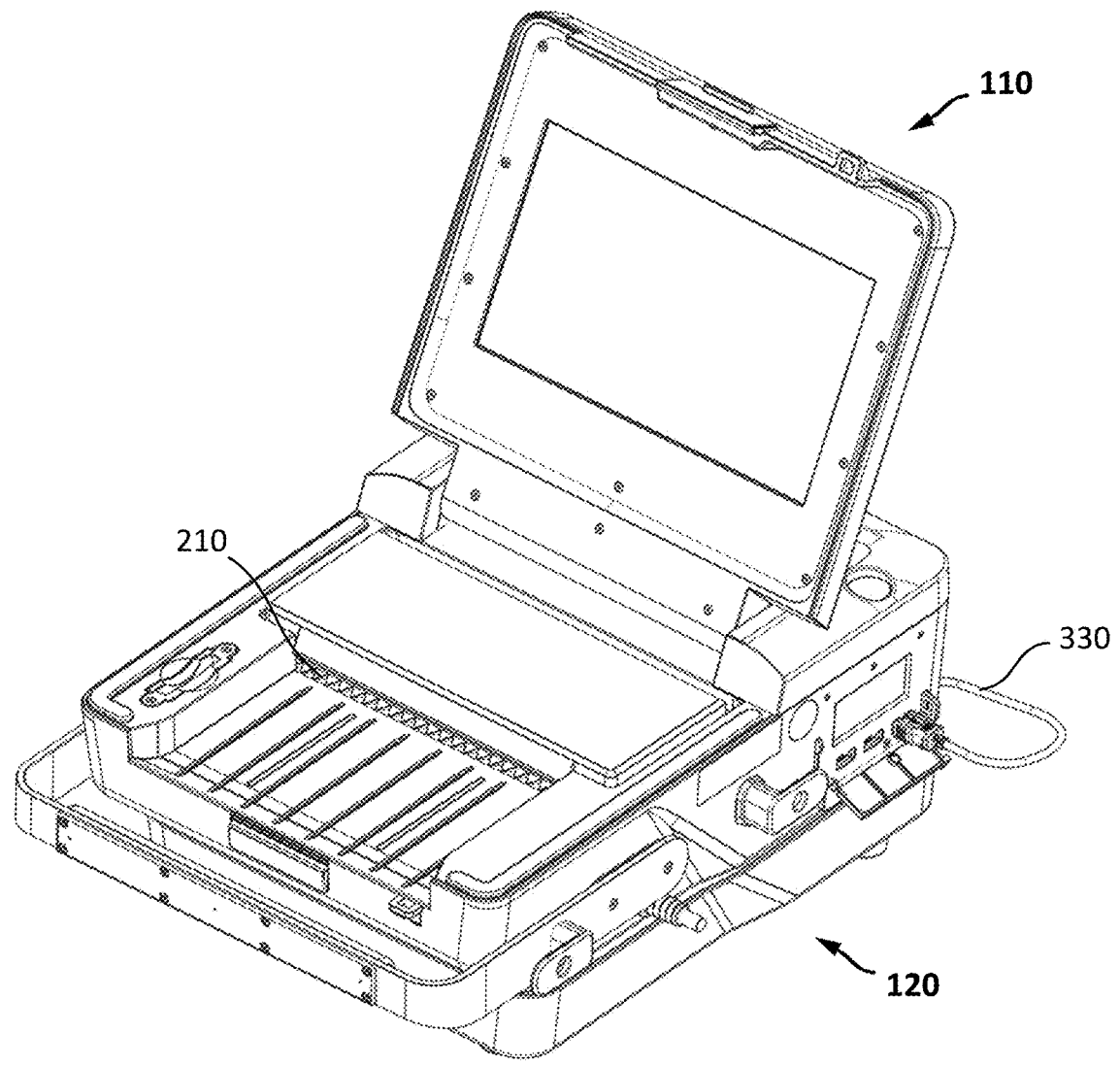
FIG. 3B is a three-dimensional front perspective view of the scanner mounted onto and attached to the imprinter shown in FIG. 3A.
Figure 3C:
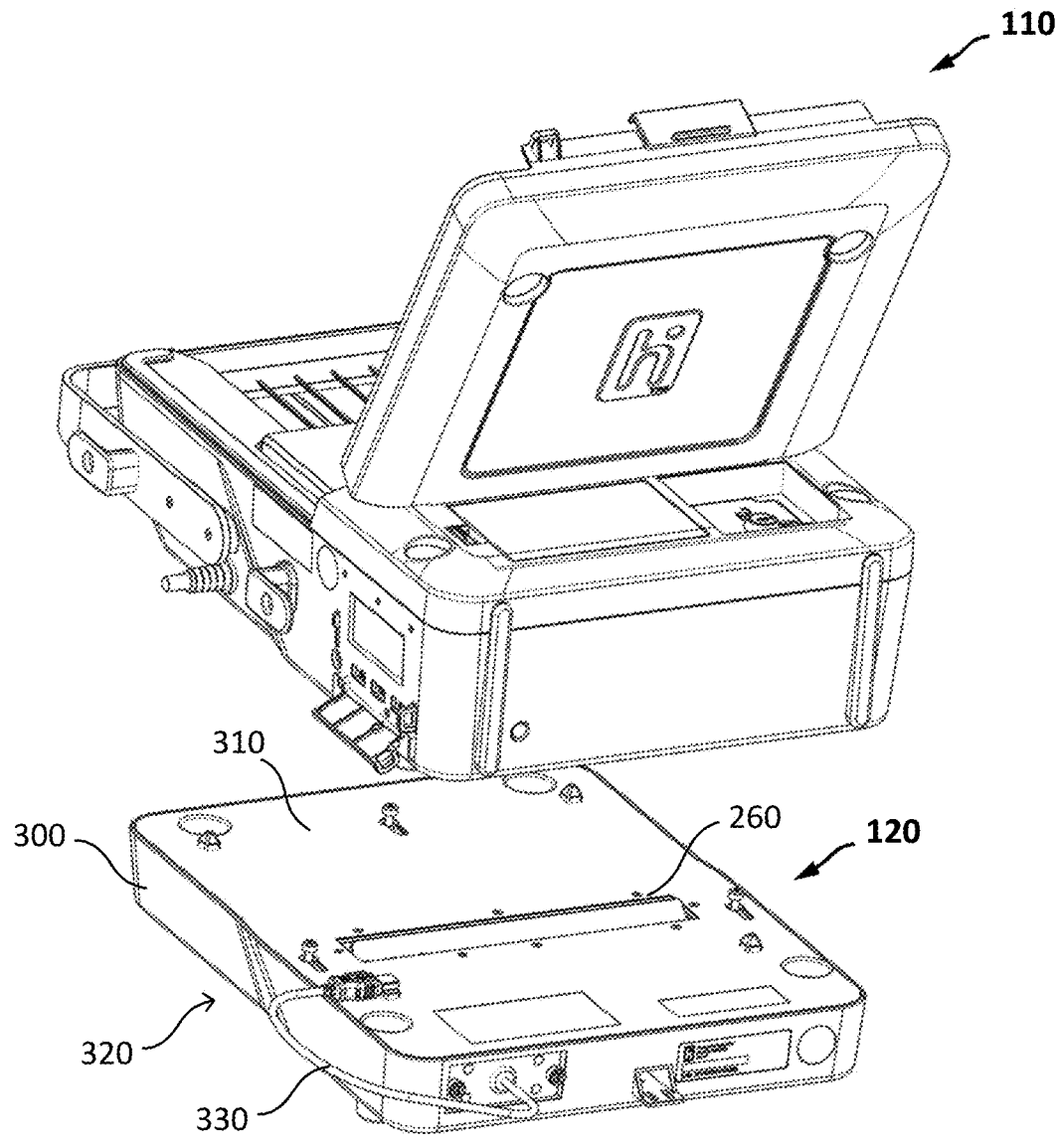
FIG. 3C is a three-dimensional rear perspective view of the imprinter shown in FIG. 3A detached from the scanner.
Figure 3D:
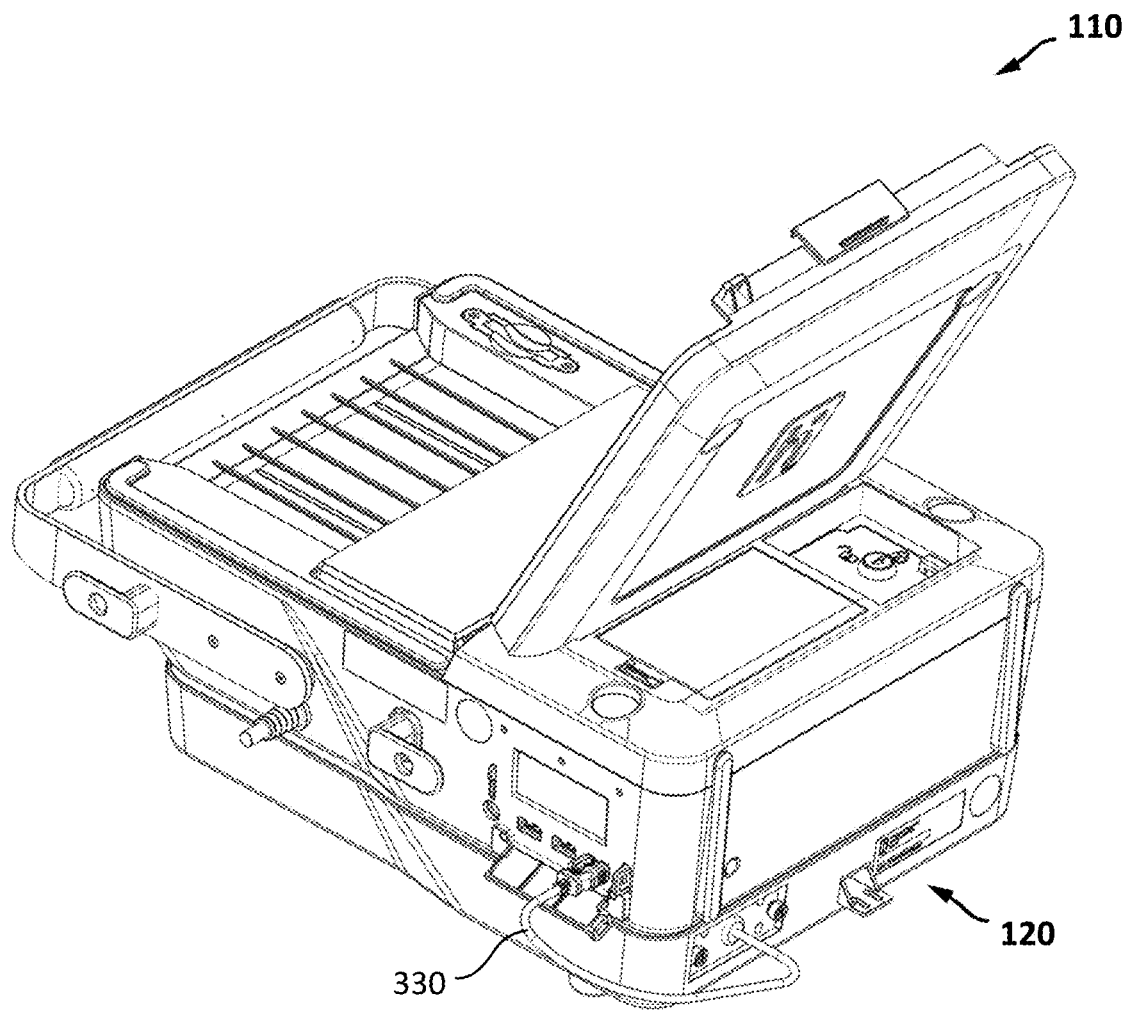
FIG. 3D is a three-dimensional rear perspective view of the scanner mounted onto and attached to the imprinter shown in FIG. 3A.
Figure 4A:
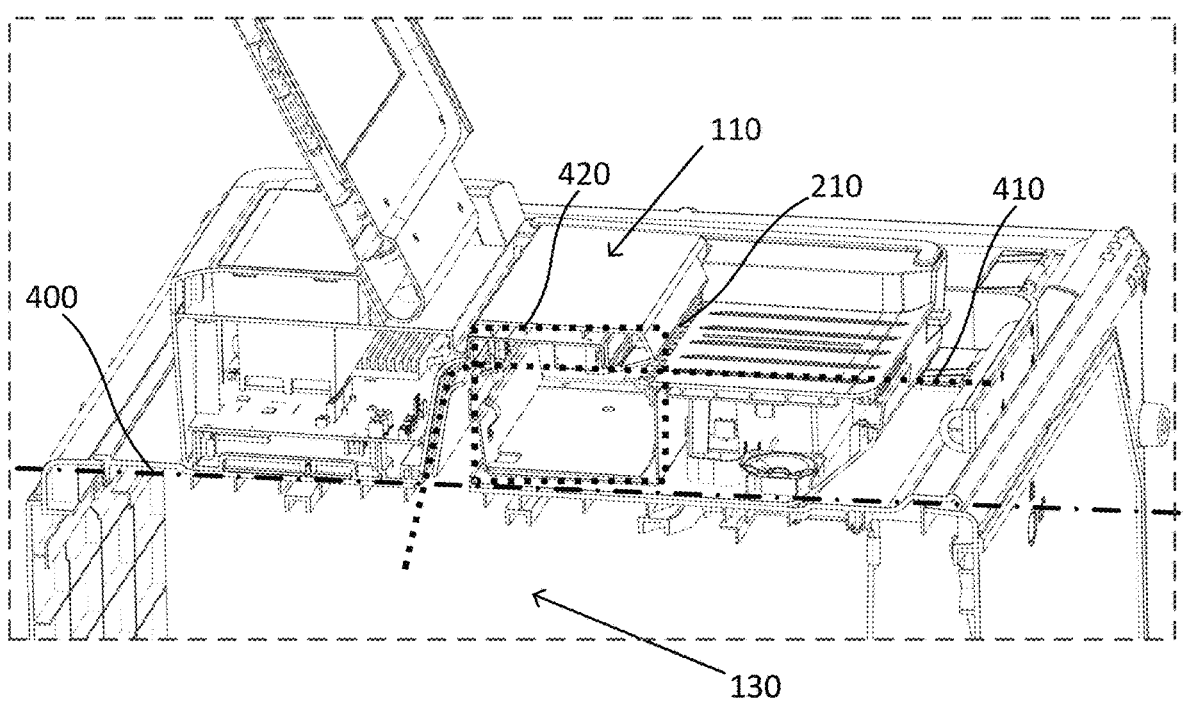
FIG. 4A is a cross-sectional side view through a scanner mounted directly on top of a ballot box, illustrating an example paper path that a printed election sheet travels through the scanner and ballot box.
Figure 4B:
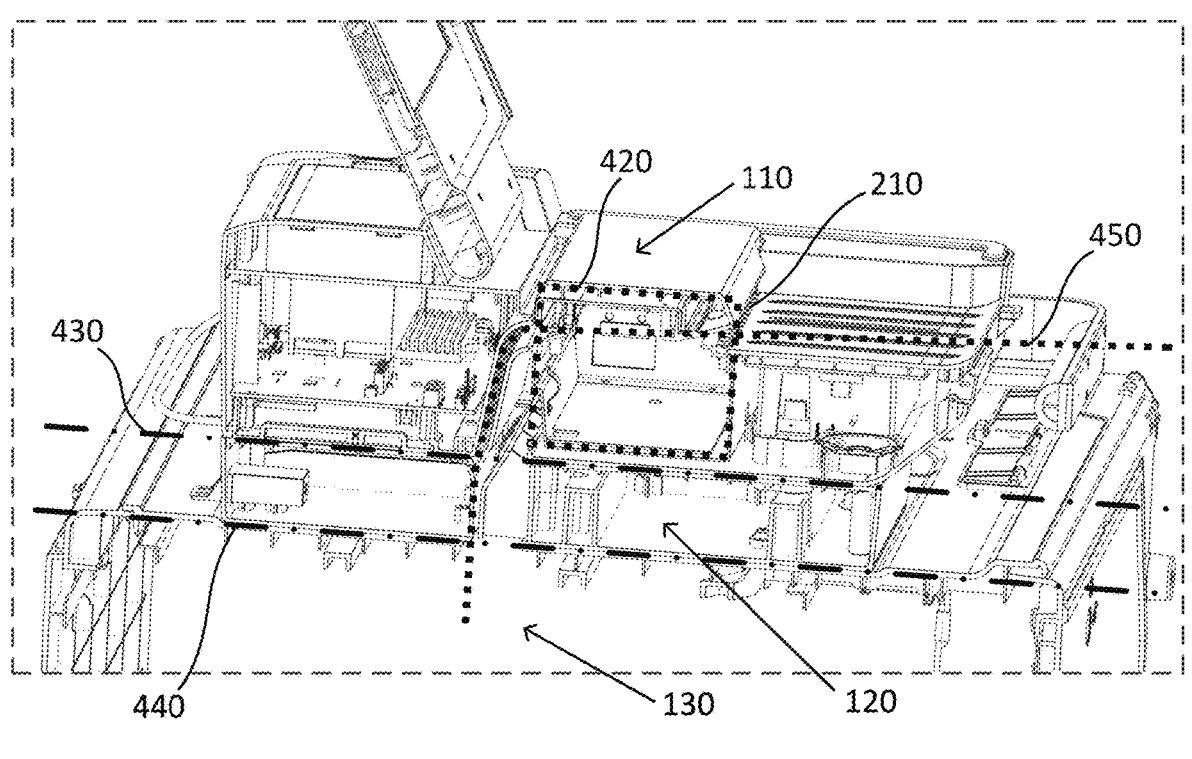
FIG. 4B is a cross-sectional side view through an imprinter coupled between a scanner and a ballot box, illustrating an example paper path that a printed election sheet travels through the scanner, the imprinter and the ballot box.
Figure 5:
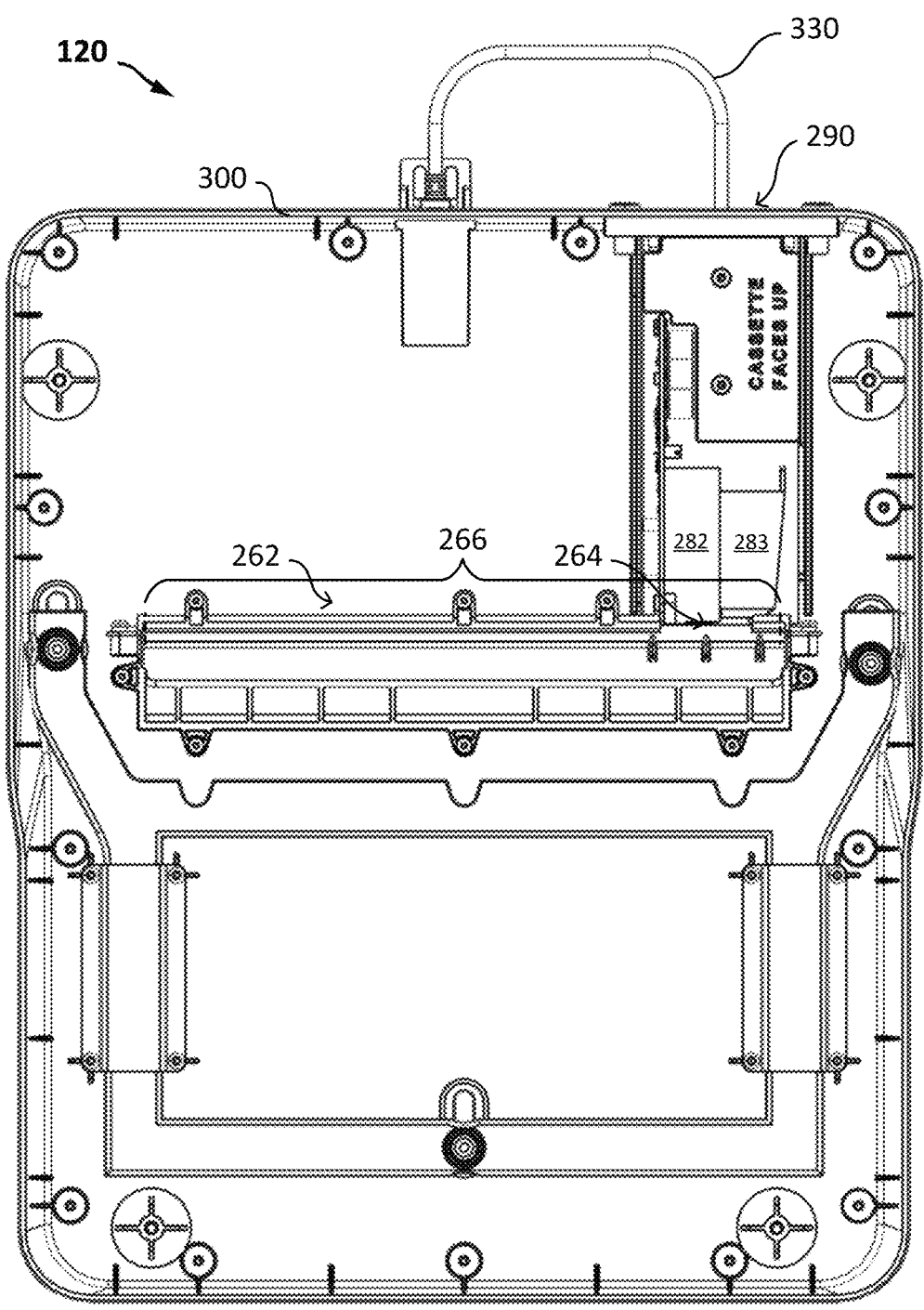
FIG. 5 is a top-down view of the imprinter shown in FIGS. 3A-3D with the top cover removed, illustrating the elongated paper slot through the imprinter and the removable cassette fully inserted and arranged in close proximity to an opening within the elongated paper slot.

FIGS. 3A-3D provide three-dimensional views illustrating an example implementation of the scanner 110 and the imprinter 120 in accordance with one embodiment of the present disclosure. FIGS. 3A-3B provide three-dimensional front perspective views of the imprinter 120 before (FIG. 3A) and after (FIG. 3B) attachment to the scanner 110. Rear views of the imprinter 120 before (FIG. 3C) and after (FIG. 3D) attachment to the scanner 110 are shown in FIGS. 3C-3D. FIGS. 4A and 4B provide cross-sectional views through the scanner 110, the imprinter 120 and the ballot box 130 with (FIG. 4B) and without (FIG. 4A) the imprinter 120. Without the imprinter 120, the scanner 110 sits directly on top of the ballot box 130, as shown in FIG. 4A. If imprinting is desired, the imprinter 120 is sandwiched between and physically attached to the bottom side of the imprinter 120 and the top of the ballot box, as shown in FIGS. 3B, 3D and 4B. In one embodiment, the scanner 110 shown in FIGS. 3A-3D and FIG. 4B may be a precinct scanner, such as the Verity Vanguard Vault or Verity Scan systems provided by Hart InterCivic Inc.

As shown in FIGS. 3A and 3C, the imprinter 120 comprises an imprinter housing 300 that is detachably coupled to the scanner 110 and the ballot box 130 with fasteners (such as screws). The input port 260 of the imprinter 120 is provided on a top cover 310 of the imprinter housing 300 and physically aligned with the output port 230 of the scanner 110 when the scanner 110 is mounted onto the imprinter 120, as shown in FIG. 4B. The output port 270 of the imprinter 120 is provided on a bottom cover 320 of the imprinter housing 300 and aligned with the opening provided on the top of the ballot box 130 when the imprinter is physically attached to the ballot box 130. When the imprinter 120 is coupled between the scanner 110 and the ballot box 130, as shown in FIGS. 3B, 3D and 4B, a USB cable 330 provides the only electrical connection between the scanner 110 and the imprinter 120. The USB cable 330 facilitates communication between the host computer 240 (located, e.g., within the scanner 110) and the printer subassembly 280 located within the imprinter 120 via the USB interfaces 249 and 288 shown in FIG. 2.

The scanner 110 is physically separate from, and mechanically independent of, the imprinter 120 as shown in FIGS. 3A and 3C. The scanner 110 operates with or without the imprinter 120. Upon receiving a printed election sheet 105 at the input port 210 of the scanner 110, the optical scanner subassembly 220 pulls in the printed election sheet 105, builds the scanned image of the printed election sheet 105, and provides the scanned image to the host computer 240 for further processing, as explained above. Based on the results of such processing and under direction of the host computer 240, the printed election sheet 105 can be front ejected from the input port 210 of the scanner 110 to return the printed election sheet 105 back to the voter (e.g., in the case of a second chance voting scenario), or rear ejected from the output port 230 of the scanner 110 to provide the printed election sheet 105 either to the input port 260 of the imprinter 120 and/or the ballot box 130.

FIG. 4A depicts the scanner 110 mounted onto and physically attached to the ballot box 130 (without an imprinter 120) and illustrates the paper path that the printed election sheet 105 travels through the scanner 110 before it is deposed into the ballot box 130. The dashed line 400 depicts the separation line between the scanner 110 and the ballot box 130, and the dotted line 410 represents the paper path through the scanner 110. The dotted box 420 illustrates the location of the optical scanner subassembly 220 integrated within the scanner 110.

When the scanner 110 is mounted directly onto and physically attached to the ballot box 130, as shown in FIG. 4A, the printed election sheet 105 is fed by the user from the front (e.g., the right side in the figure) and scanned from front-to-back to generate the scanned image of the printed election sheet 105. The mechatronics in the optical scanner subassembly 220 (e.g., the roller subassembly 224) pull the printed election sheet 105 in from the front through a set of rollers and servos, always maintaining positive control. Based on the results of the image processing performed by the host computer 240, the printed election sheet 105 can be reversed back-to-front and front ejected from the input port 210 of the scanner 110 to provide the printed election sheet 105 back to the voter in the case of second chance voting scenario. Alternatively, the voter's ballot can be "casted" by creating an electronic CVR of the voter's voting selections and rear ejecting the printed election sheet 105 from the output port 230 of the scanner 110 directly into the ballot box 130, following the dotted line 410 shown in FIG. 4A. When the optical scanner subassembly 220 follows the host-directed rear eject command, the scanner's rollers rotate to move and deposit the printed election sheet 105 into the ballot box 130.

FIG. 4B depicts the imprinter 120 sandwiched between and physically connected to the scanner 110 and the ballot box 130. The dotted box 420 represents the optical scanner subassembly 220 integrated within the scanner 110 as explained in reference to FIG. 4A. In the embodiment shown in FIG. 4B, the dashed line 430 depicts the separation between the underside of the scanner 110 and the top side of the imprinter 120, while the dashed line 440 shows the separation between the bottom side of the imprinter 120 and the top of the ballot box 130. The dotted line 450 represents the paper path that the printed election sheet 105 travels through the scanner 110 and the imprinter 120 before it is deposed into the ballot box 130.

When the imprinter 120 is coupled between the scanner 110 and the ballot box 130, as shown in FIG. 4B, the process of receiving, scanning and processing a printed election sheet 105 is the same as described above. The addition of the imprinter 120 does not change the optical scanner functionality or the image processing and analysis performed by the host computer 240. Instead, the system behavior changes as the host computer 240 drives the ballot processing operation to include the act of imprinting as part of the scanning operation. The scanner 110 and the imprinter 120 have no direct communication link-all command/control for both scanning and imprinting is provided through the host. Assuming no second chance voting issues exist, the host computer 240 may cast the voter's ballot by creating an electronic CVR of the voter's voting selections, as well as a unique identifier corresponding to the electronic CVR, before instructing the optical scanner subassembly 220 to provide the printed election sheet 105 to the imprinter 120 for imprinting operations.

In order to imprint the unique identifier (e.g., an alphanumeric text string) onto the printed election sheet 105, the host computer 240 provides instructions to both the scanner 110 and the imprinter 120 to move the printed election sheet 105 in a manner that results in the unique identifier being imprinted at a specific (e.g., x/y) location on the printed election sheet 105. As the printed election sheet 105 is in a rear escrow position (i.e., physically held by the rollers in the roller subassembly 224), the host computer 240 instructs the imprinter 120 to print the unique identifier onto the printed election sheet 105 and synchronizes the imprinting operating with the movement of the paper in the paper path 122 of the imprinter 120. Once imprinted, the host computer 240 supplies a rear eject command to the optical scanner subassembly 220, which causes the roller subassembly 224 to move the printed election sheet 105 through the paper path 122 and the output port 270 of the imprinter 120 to deposit the printed election sheet 105 into the ballot box 130, following the dotted line 450 shown in FIG. 4B. When the optical scanner subassembly 220 follows the host-directed rear eject command, the scanner's rollers rotate to move the printed election sheet 105 through the paper path 122 of the imprinter 120 and deposit the printed election sheet 105 into the ballot box 130.

The imprinter electronics have no intelligence on what to print; all information is passed down from the host computer 240. The host computer 240 instructs the imprinter 120 what to print through a host-to-imprinter command signal supplied to the printer subassembly 280. The host-to-imprinter command signal may generally include a print command (or write command) and the unique identifier. Once the imprinter 120 is informed of what to write (the unique identifier), the printer subassembly 280 is directed by the host computer 240 to perform the imprint by writing the unique identifier onto the printed election sheet 105 at the specified location. In some embodiments, the host-to-imprinter command signal supplied to the printer subassembly 280 to perform the write may be accompanied by a time delay (measured in milliseconds), which specifies the amount of time the printer subassembly 280 needs to wait before starting the write to synchronize the imprinting operation with the movement of the printed election sheet 105 in the paper path 122 of the imprinter 120. Thus, the host-to-imprinter command signal to write the unique identifier onto the printed election sheet 105 is sent with a time delay before the actual firing of the print head 282. This provides the host computer 240 with the time needed to direct the optical scanner subassembly 220 to move the printed election sheet 105 back-to-front through a rotation of the rollers within the roller subassembly 224 to synchronize the paper movement with the imprinting operation.

After the host computer 240 directs the printer subassembly 280 to write the unique identifier (with the print head firing time based on the specified time delay), the host computer 240 supplies a host-to-scanner command signal to the optical scanner subassembly 220 to direct the movement of the printed election sheet 105 through the optical scanner subassembly 220, using the roller subassembly 224 to pull the printed election sheet 105 forward at the time when the host-to-imprinter command signal activates the print head 282. The host-to-scanner command signal causes the roller subassembly 224 to pull the printed election sheet 105 back-to-front, at a given speed and distance, aligning it with the imprint firing. Once the printed election sheet 105 has been pulled forward, now fully imprinted, the host computer 240 directs the optical scanner subassembly 220 to deposit the printed election sheet 105 into the ballot box 130 by supplying a rear eject command to the optical scanner subassembly 220.

The command flow described above shows the coordination provided by the host computer 240 to synchronize the imprinting operation with the movement of the printed election sheet 105, using the paper handling components within the optical scanner subassembly 220 to provide the physical paper movement, coordinated with the electronics within the printer subassembly 280 to control the firing of the print head 282 to print the unique identifier in the desired location.

The command flow described above requires tight command flow synchronization, coordinated by the host computer 240, to ensure the print head 282 fires at exactly the right time to imprint the printed election sheet 105 when needed for proper text placement. In an alternative embodiment, this tight coupling may be reduced by adding physical "sense marks" (e.g., black printed rectangles located on the left/right margins at specific x/y locations) to the printed election sheet 105 prior to use. The use of sense marks enables the imprinter 120 to detect the presence of the sense mark, and then print the unique identifier at the location when found. The host computer 240 and scanner 110 maintain control of paper handling through the scanner 110 and the imprinter 120. The additional capabilities added to the imprinter electronics and firmware to detect presence of the sense mark, and then fire the print head 282 based on mark detection, remove the need for the host computer 240 to direct this activity. This allows for greater independence of the externally attached, non-integrated imprinter 120.

One of the challenges in imprinting with an externally attached, non-integrated imprinter 120 is the paper control through the entire system 100. The printed election sheet 105 must be near the print head 282 (e.g., within one millimeter) for effective/quality printing on the paper. However, the imprinter 120 includes no active paper handling components (e.g., no rollers, belts or other movable components configured to actively guide the printed election sheet 105 through the paper path 122 of the imprinter 120). Thus, the challenge in paper movement comes with the competing concerns of allowing "free" paper movement through the imprinter 120 (as there is no positive control in the imprinter itself), yet reliably place the printed election sheet 105 in close proximity to the print head 282 during imprinting. The challenge is even greater when taking paper handling variability into account (e.g., paper curls, folds, dog ears, etc.), all of which challenge the natural flow of paper through the paper path 122. In other words, the goal is to allow free movement of paper that tends to bind, while placing the paper in position against a print head, yet do so without introducing positive paper controls within the imprinter, itself.

The imprinter 120 described in the present disclosure handles competing paper handling concerns through a unique mechanical design that provides enough gap for the printed election sheet 105 to travel through the imprinter 120, yet forces the paper into close alignment with the print head 282, all as part of the natural travel of the printed election sheet 105 through the imprinter 120 (as controlled by the scanner movement under the direction of the host computer 240). The unique mechanical design includes two main components: (a) the paper guide mechanism 262, which is positioned between the input port 260 and output port 270 of the imprinter 120 for passively guiding the printed election sheet 105 through the paper path 122 of the imprinter 120, and (b) the removable cassette 290 comprising printer subassembly 280 and the consumable print medium 283.

Figure 6A:
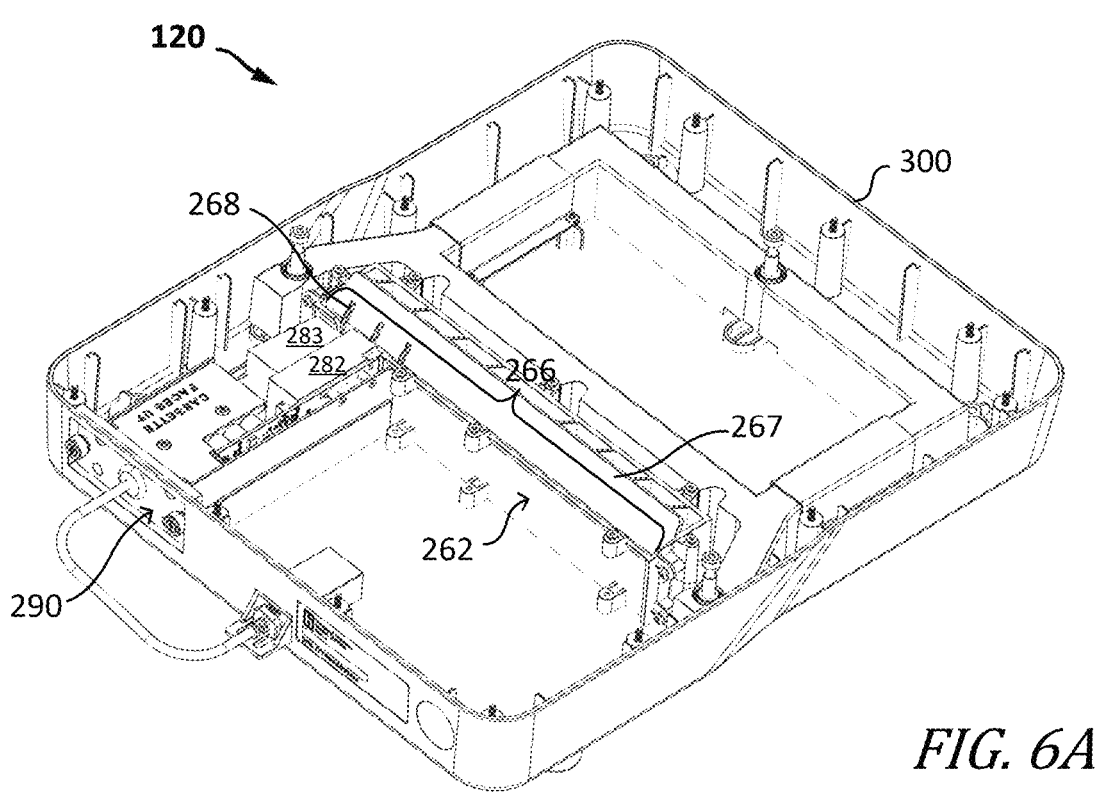
FIG. 6A is a three-dimensional rear perspective view of the imprinter shown in FIGS. 3A-3D and FIG. 5 with the top cover removed and the removable cassette fully inserted.

FIG. 5 and FIGS. 6A-6C provide various views of the imprinter 120 with the top cover 310 removed, illustrating the paper guide mechanism 262 and removable cassette 290 included therein. As shown in FIGS. 5 and 6A-6C, the paper guide mechanism 262 generally includes: (a) an elongated paper slot 266 configured to position and passively guide the printed election sheet 105 through the paper path 122 of the imprinter 120, and (b) an opening 264 adjacent to the printer subassembly 280 that exposes a portion of the printed election sheet 105 when the printed election sheet 105 is positioned within the paper path 122 of the imprinter 120. When the removable cassette 290 is fully inserted within the imprinter housing 300, as shown in FIG. 6A, the print head 282 of the printer subassembly 280 is positioned adjacent to the opening 264 in the paper guide mechanism 262 at a distance (e.g., less than one millimeter) that enables the print head 282 to effectively print the unique identifier onto the printed election sheet 105. Thus, the paper guide mechanism 262 allows free movement of the printed election sheet 105 through the imprinter 120, while ensuring the printed election sheet 105 is reliably placed in close proximity to the print head 282 during imprinting.

Figure 6B:
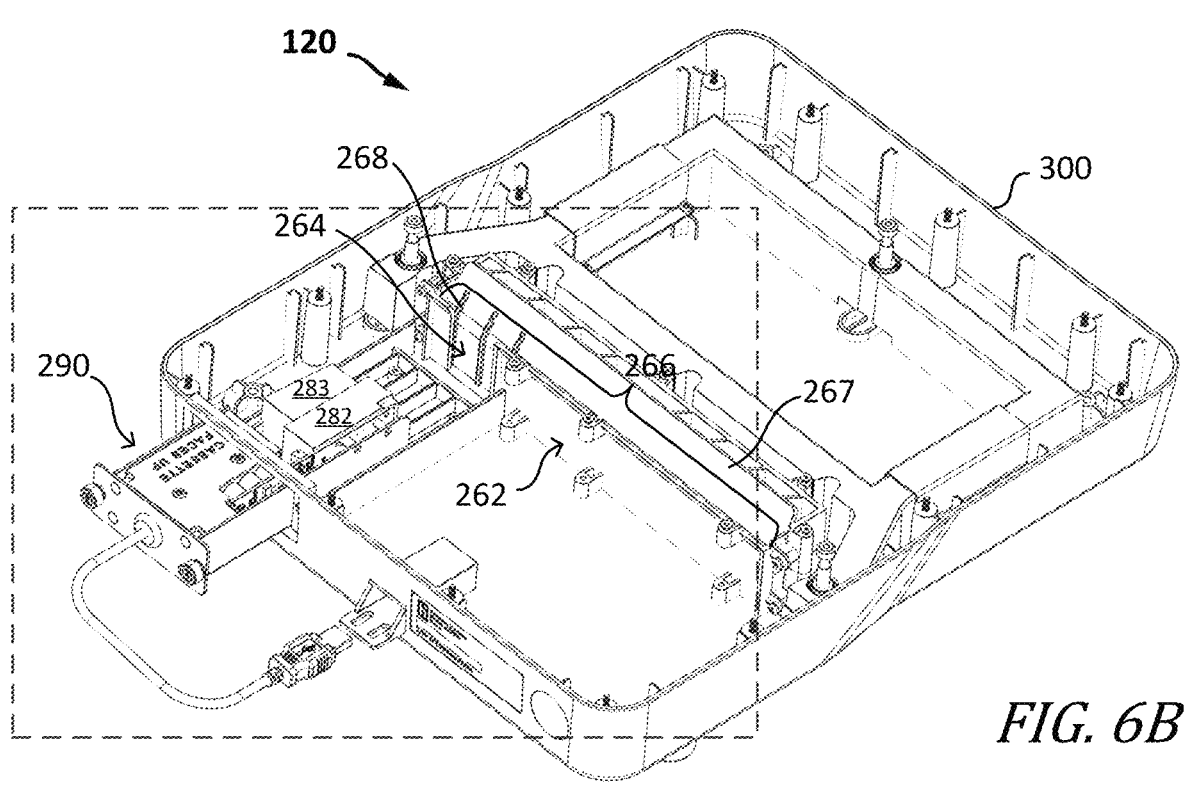
FIG. 6B is a three-dimensional rear perspective view of the imprinter shown in FIGS. 3A-3D and FIG. 5 with the top cover removed and the removable cassette partially removed.
Figure 6C:
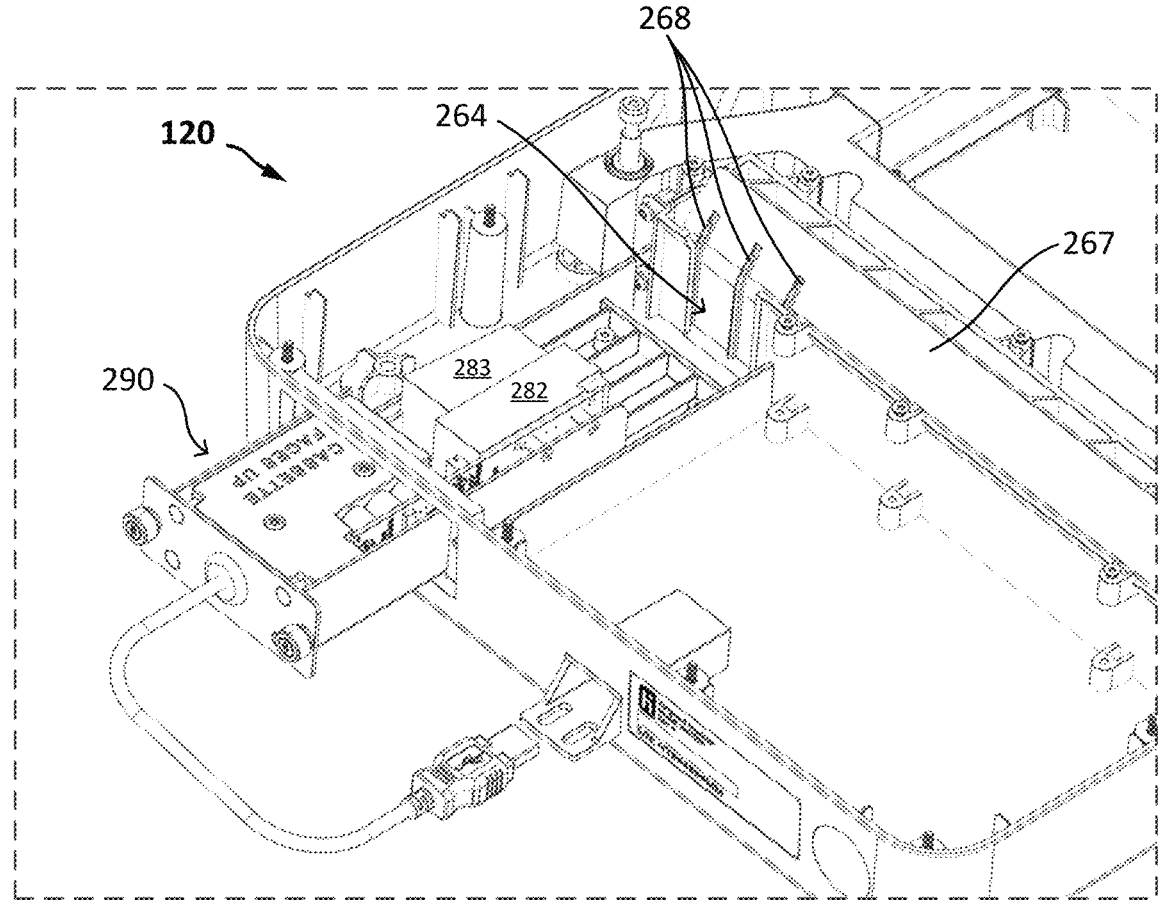
FIG. 6C is an expanded view of the box shown in FIG. 6B.

Additional features of the paper guide mechanism 262 are provided to take into account paper handling variability. As shown in FIGS. 6A-6C, for example, an upper portion 267 of the paper guide mechanism 262 is angled (e.g., between 2° to 57° from vertical) to guide the printed election sheet 105 into the elongated paper slot 266. The elongated paper slot 266 is essentially an elongated slot (or gap) between opposing interior sidewalls of the paper guide mechanism 262. The width of the elongated paper slot 266 is preferably wide enough (e.g., between 1.0-3.2 mm) to allow the printed election sheet 105 to travel freely through the paper path 122 of the imprinter 120 without bunching or binding, thus allowing paper with deformities (e.g., paper curls, folds, dog ears, etc.), to travel unimpeded through the paper path 122 of the imprinter 120. In some embodiments, a plurality of ribs 268 may be provided on one or more interior sidewalls of the paper guide mechanism 262 to force the printed election sheet 105 in close proximity to the print head 282 during imprinting.

As shown in FIGS. 6B and 6C, the removable cassette 290 may be at least partially removed from the imprinter housing 300 to service the printer subassembly 280 and/or gain access to the consumable print medium 283. The use of the removable cassette 290 enables the consumable print medium 283 to be replaced, while preventing access to the paper path 122 of the imprinter 120. This eliminates security concerns by restricting access to secure locations within the imprinter 120 (such as the paper path 122). Additional security is provided by generating alerts (e.g., visual or audible alerts) to notify election personnel if/when the removable cassette 290 is at least partially removed from the imprinter housing 300.

Figure 7:
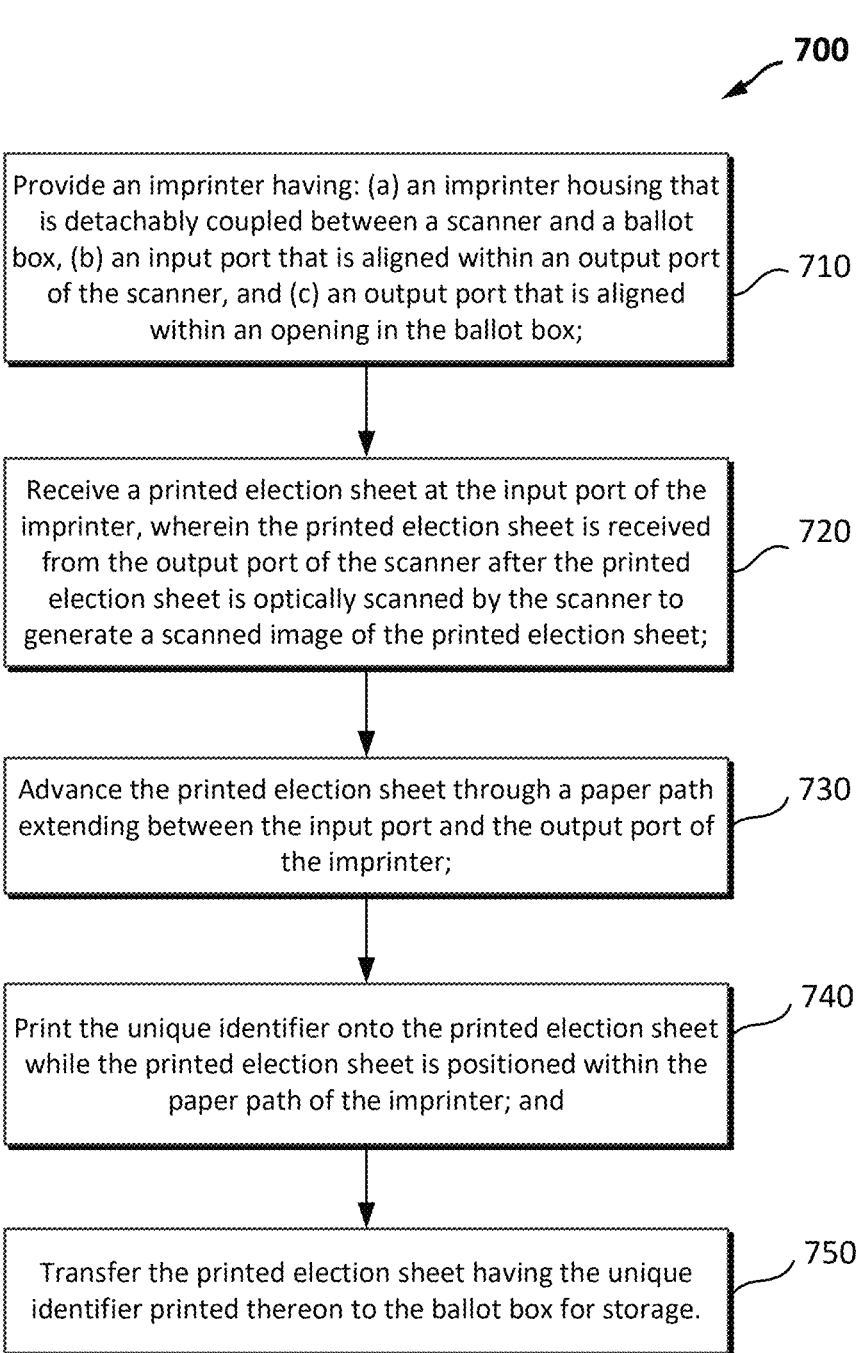
FIG. 7 is a flowchart diagram illustrating one embodiment of a method to print a unique identifier on a printed election sheet of a voter's voting selections in an election in accordance with one embodiment of the present disclosure.

FIG. 7 illustrates one embodiment of a method 700 to print a unique identifier onto a printed election sheet of a voter's voting selections in an election. It will be recognized that the embodiment shown in FIG. 7 is exemplary and additional methods may utilize the techniques described herein. Further, additional steps may be added to the method shown in FIG. 7 as the steps described are not intended to be exclusive. Moreover, the order of the steps is not limited to the order shown in FIG. 7 as different orders may occur and/or various steps may be performed in combination or at the same time.

The method 700 shown in FIG. 7 may begin, in some embodiments, by providing an imprinter having: (a) an imprinter housing that is detachably coupled between a scanner and a ballot box, (b) an input port that is aligned within an output port of the scanner, and (c) an output port that is aligned within an opening in the ballot box (in step 710). As such, the method 700 may begin by providing an externally attached, non-integrated imprinter between a scanner and ballot box in step 710. The method 700 may utilize any of the externally attached, non-integrated imprinter embodiments shown in FIGS. 2, 3A-3D, 4B, 5, 6A-6C and described above, or an equivalent thereof comprising one or more of the features described above.

After providing the imprinter between the scanner and the ballot box (in step 710), the method 700 may continue sometime thereafter by receiving a printed election sheet at the input port of the imprinter (in step 720). Specifically, the printed election sheet may be received in step 720 from the output port of the scanner after the printed election sheet is optically scanned by the scanner to generate a scanned image of the printed election sheet. The method 700 may further include advancing the printed election sheet through a paper path extending between the input port and the output port of the imprinter (in step 730) and printing a unique identifier onto the printed election sheet while the printed election sheet is positioned within the paper path (in step 740) before transferring the printed election sheet having the unique identifier printed thereon to the ballot box for storage (in step 750). In the method 700 shown in FIG. 7, the steps 730 and 750 are performed by scanner and the step 740 is performed by the imprinter in response to command signals received from a host processing device (such as, e.g., the host computer 240) communicatively coupled to the scanner and the imprinter.

In some embodiments, the imprinter may include a removable cassette comprising a consumable print medium, and the method 700 may further include at least partially removing the removable cassette from the imprinter housing to gain access to the consumable print medium, while preventing access to the paper path of the imprinter.

In some embodiments, the imprinter may include a removable cassette comprising a print head. In such embodiments, the step of printing the unique identifier onto the printed election sheet (step 740) may be enabled when: (a) the removable cassette is fully inserted within the imprinter housing to position the print head adjacent to the printed election sheet positioned within the paper path of the imprinter, and (b) the imprinter receives a command signal from the host processing device to print the unique identifier onto the printed election sheet.

Further modifications and alternative embodiments of the inventions described herein will be apparent to those skilled in the art in view of this description. Accordingly, this description is to be construed as illustrative only and is for the purpose of teaching those skilled in the art the manner of carrying out the inventions described and claimed herein. It is to be understood that the forms and methods of the inventions herein shown and described are to be taken as presently preferred embodiments. Equivalent techniques may be substituted for those illustrated and described herein and certain features of the inventions may be utilized independently of the use of other features, all as would be apparent to one skilled in the art after having the benefit of this disclosure.

What is claimed is:

1. An election voting system for processing a printed election sheet of a voter's voting selections in an election, comprising:

a scanner comprising an input port coupled to receive the printed election sheet, an optical scanner subassembly configured to optically scan the printed election sheet and generate a scanned image of the printed election sheet and an output port coupled to output the printed election sheet;

an imprinter detachably coupled between the scanner and a ballot box configured to store the printed election sheet, wherein the imprinter is not integrated within the scanner, wherein the imprinter is coupled to receive the printed election sheet output from the output port of the scanner and configured to print a unique identifier onto the printed election sheet before the printed election sheet is provided to the ballot box, wherein the scanner controls movement of the optically scanned printed election sheet through a paper path of the imprinter, and wherein the imprinter does not include a roller, a belt or another movable component configured to actively guide the optically scanned printed election sheet through the paper path of the imprinter; and a host processing device communicatively coupled to the scanner and the imprinter, wherein the host processing device is coupled to receive the scanned image of the printed election sheet from the scanner and configured to use the scanned image of the printed election sheet to create an electronic cast vote record of the voter's voting selections, and wherein the host processing device is further coupled to supply command signals to the scanner and the imprinter to independently control operations performed by the scanner and the imprinter.

2. The election voting system of claim 1, wherein the imprinter is configured to print the unique identifier onto the printed election sheet during or after the electronic cast vote record is created, yet before the printed election sheet is provided to the ballot box.

3. The election voting system of claim 1, wherein the imprinter comprises:

an input port coupled to receive the printed election sheet output from the output port of the scanner;

a paper guide mechanism positioned between the input port of the imprinter and an output port of the imprinter for passively guiding the printed election sheet through the paper path of the imprinter;

a printer subassembly configured to print the unique identifier onto the printed election sheet while the printed election sheet is positioned within the paper path of the imprinter; and wherein the output port of the imprinter is coupled to provide the printed election sheet having the unique identifier printed thereon to the ballot box.

4. The election voting system of claim 3, wherein the imprinter further comprises a removable cassette comprising a consumable print medium, and wherein the removable cassette is at least partially removed from the imprinter to gain access to the consumable print medium while preventing access to the paper path of the imprinter.

5. The election voting system of claim 3, wherein scanner further comprises the host processing device, and wherein the host processing device is communicatively coupled to the optical scanner subassembly included within the scanner and the printer subassembly included within the imprinter to independently control operations of the optical scanner subassembly and the printer subassembly.

6. The election voting system of claim 3, wherein the optical scanner subassembly comprises:

hardware components configured to optically scan the printed election sheet and generate the scanned image of the printed election sheet;

a roller subassembly for actively guiding the printed election sheet through a paper path extending between the input port of the scanner and the output port of the scanner; and a microprocessor coupled to control the hardware components and the roller subassembly in response to command signals received from the host processing device.

7. The election voting system of claim 6, wherein the host processing device is coupled to supply:

a first set of command signals to the optical scanner subassembly, which cause the roller subassembly to feed the printed election sheet received at the input port of the scanner into the optical scanner subassembly; and a second set of command signals to the optical scanner subassembly, which cause the hardware components to optically scan the printed election sheet, generate the scanned image of the printed election sheet and supply the scanned image of the printed election sheet to the host processing device for further processing.

8. The election voting system of claim 7, wherein when the imprinter is not coupled between the scanner and the ballot box, the host processing device is coupled to supply:

a third set of command signals to the optical scanner subassembly, which cause the roller subassembly to continue to feed the printed election sheet through the paper path and the output port of the scanner into the ballot box.

9. The election voting system of claim 7, wherein when the imprinter is coupled between the scanner and the ballot box, the host processing device is coupled to supply:

a third set of command signals to the optical scanner subassembly, which cause the roller subassembly to continue to feed the printed election sheet through the paper path and the output port of the scanner into the input port and the paper path of the imprinter;

a fourth set of command signals to the printer subassembly to print the unique identifier onto the printed election sheet; and a fifth set of command signals to the optical scanner subassembly, which cause the roller subassembly to continue to feed the printed election sheet through the paper path and the output port of the imprinter into the ballot box after the unique identifier is printed onto the printed election sheet.

10. The election voting system of claim 9, wherein the fourth set of command signals comprises a print command, the unique identifier and a time delay specifying when to print the unique identifier onto the printed election sheet.

11. The election voting system of claim 9, wherein the fourth set of command signals comprises a print command and the unique identifier, and wherein the imprinter prints the unique identifier onto the printed election sheet upon detecting a sense mark provided on the printed election sheet.

12. An imprinter for use in an election voting workflow utilizing a printed election sheet of a voter's voting selections in an election, the imprinter comprising:

an imprinter housing detachably coupled between a scanner and a ballot box, wherein the scanner is configured to optically scan the printed election sheet and generate a scanned image of the printed election sheet, and wherein the ballot box is configured to store the optically scanned printed election sheet;

an input port provided on a top cover of the imprinter housing, wherein the input port is coupled to receive the optically scanned printed election sheet from an output port of the scanner;

a paper guide mechanism positioned between the input port of the imprinter and an output port of the imprinter for passively guiding the optically scanned printed election sheet through a paper path of the imprinter;

a printer subassembly configured to print a unique identifier onto the optically scanned printed election sheet while the optically scanned printed election sheet is positioned within the paper path of the imprinter;

wherein the imprinter does not include a roller, a belt or another movable component configured to actively guide the optically scanned printed election sheet through the paper path of the imprinter; and wherein the output port of the imprinter is provided on a bottom cover of the imprinter housing and coupled to provide the optically scanned printed election sheet having the unique identifier printed thereon to the ballot box.

13. The imprinter of claim 12, wherein the imprinter further comprises a removable cassette comprising a consumable print medium, and wherein the removable cassette is at least partially removed from the imprinter to gain access to the consumable print medium while preventing access to the paper path of the imprinter.

14. The imprinter of claim 12, wherein the printer subassembly is coupled to receive command signals from a host processing device communicatively coupled to the imprinter to control the printing of the unique identifier onto the optically scanned printed election sheet.

15. The imprinter of claim 14, wherein the command signals received from the host processing device comprise a print command, the unique identifier and a time delay specifying when to print the unique identifier onto the optically scanned printed election sheet.

16. The imprinter of claim 12, wherein the paper guide mechanism comprises:

an elongated paper slot for positioning and passively guiding the optically scanned printed election sheet through the paper path of the imprinter; and an opening adjacent to the printer subassembly that exposes a portion of the optically scanned printed election sheet when the optically scanned printed election sheet is positioned within the paper path of the imprinter.

17. The imprinter of claim 16, wherein the paper guide mechanism does not include a roller, a belt or another movable component configured to actively guide the optically scanned printed election sheet through the paper path of the imprinter.

18. The imprinter of claim 17, wherein the scanner controls movement of the optically scanned printed election sheet through the paper path of the imprinter.

19. The imprinter of claim 17, wherein the imprinter further comprises a removable cassette comprising the printer subassembly and a consumable print medium, wherein when the removable cassette is fully inserted within the imprinter housing, a print head of the printer subassembly is positioned adjacent to the opening in the paper guide mechanism at a distance that enables the print head to print the unique identifier onto the optically scanned printed election sheet.

20. The imprinter of claim 19, wherein the removable cassette is at least partially removed from the imprinter housing to gain access to the consumable print medium, while preventing access to the paper path of the imprinter.

21. A method to print a unique identifier onto a printed election sheet of a voter's voting selections in an election, the method comprising:

providing an imprinter having: (a) an imprinter housing that is detachably coupled between a scanner and a ballot box, (b) an input port that is aligned within an output port of the scanner, and (c) an output port that is aligned within an opening in the ballot box;

receiving a printed election sheet at the input port of the imprinter, wherein the printed election sheet is received from the output port of the scanner after the printed election sheet is optically scanned by the scanner to generate a scanned image of the printed election sheet;

advancing the printed election sheet through a paper path extending between the input port and the output port of the imprinter;

printing the unique identifier onto the printed election sheet while the printed election sheet is positioned within the paper path of the imprinter;

transferring the printed election sheet having the unique identifier printed thereon to the ballot box for storage; and wherein said advancing the printed election sheet through a paper path extending between the input port and the output port of the imprinter and said transferring the printed election sheet to the ballot box are performed by the scanner in response to command signals received by the scanner from a host processing device communicatively coupled to the scanner and the imprinter.

22. The method of claim 21, wherein the imprinter does not include a moveable component capable of advancing the printed election sheet through the paper path extending between the input port and the output port of the imprinter or transferring the printed election sheet to the ballot box.

\* \* \* \* \*